United States Patent
Li et al.

(10) Patent No.: US 8,533,617 B2
(45) Date of Patent: Sep. 10, 2013

(54) METHOD AND COMPUTER SYSTEM FOR DISPLAYING A WEIGHTED TREE BASED ON HYPERBOLIC GEOMETRY

(75) Inventors: Shih-Gong Li, Beijing (CN); Shixia Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/847,545

(22) Filed: Aug. 30, 2007

(65) Prior Publication Data
US 2008/0077875 A1    Mar. 27, 2008

(30) Foreign Application Priority Data
Aug. 30, 2006    (CN) .......................... 2006 1 0115195

(51) Int. Cl.
G06F 3/048        (2013.01)
(52) U.S. Cl.
USPC .......................................... 715/764; 715/853
(58) Field of Classification Search
USPC ......................................... 715/764, 853, 854
See application file for complete search history.

(56) References Cited

U.S. PATENT DOCUMENTS

| | | | | |
|---|---|---|---|---|
| 5,590,250 A * | 12/1996 | Lamping et al. | ............... | 345/427 |
| 5,835,085 A * | 11/1998 | Eick et al. | ...................... | 715/853 |
| 6,108,698 A * | 8/2000 | Tenev et al. | .................... | 709/220 |
| 6,237,006 B1 * | 5/2001 | Weinberg et al. | ............. | 707/797 |
| 6,300,957 B1 * | 10/2001 | Rao et al. | ....................... | 345/441 |
| 6,377,259 B1 * | 4/2002 | Tenev et al. | .................... | 345/440 |
| 6,396,819 B1 * | 5/2002 | Fleeter et al. | ................. | 370/320 |
| 6,470,383 B1 * | 10/2002 | Leshem et al. | ................ | 709/223 |
| 6,654,761 B2 * | 11/2003 | Tenev et al. | ............................ | 1/1 |
| 7,086,012 B1 * | 8/2006 | Perttunen | ...................... | 715/853 |
| 2006/0230140 A1 * | 10/2006 | Aoyama et al. | ............... | 709/224 |
| 2007/0174019 A1 * | 7/2007 | Vailaya et al. | ................ | 702/179 |

* cited by examiner

*Primary Examiner* — Rashawn Tillery
(74) *Attorney, Agent, or Firm* — William Stock; Anne Vachon Dougherty (57) ABSTRACT

The invention discloses a method for displaying a weighted tree based on hyperbolic geometry, comprising: obtaining weighted tree data defining a weighted tree structure; positioning the root node in a negatively curved space as a center, based on the weighted tree defining data; based on the weighted tree defining data, performing layout processing for each parent node and all its direct child nodes from top to bottom recursively, until all the nodes in the tree have been laid out in the negatively curved space, wherein the higher the weight of an edge connecting the parent node and each of its direct child nodes is, the shorter the distance between the parent node and the child node is; mapping the layout data from the negative curved space to an Euclidean plane; and displaying the mapped data in display.

9 Claims, 6 Drawing Sheets

METHOD AND COMPUTER SYSTEM FOR DISPLAYING A WEIGHTED TREE BASED ON HYPERBOLIC GEOMETRY

TECHNICAL FIELD

The invention relates to visualization of a large hierarchy, and in particular to a method of displaying a weighted tree based on hyperbolic geometry.

BACKGROUND OF THE INVENTION

Lamping, J. and Rao, R., "The Hyperbolic Browser: A Focus+Context Technique for Visualizing Large Hierarchies", Journal of Visual Languages and Computing, Vol. 7, 1996, pp. 33-55, disclose techniques for laying out a hierarchy such as a tree on a negatively curved space (e.g., a hyperbolic plane) such that distance between parent and child and between siblings is approximately the same everywhere. A recursive algorithm lays out each node based on local information, allocating a wedge of the hyperbolic plane for the node's descendants. The algorithm places all the children along an arc in the wedge, at an equal distance from the parent node, and at least a minimum distance (or base spacing) apart from each other. The layout of a node depends only on the layout of its parent and on the node structure of two or three generations starting from the parent. Therefore, the layout can be done incrementally, such as by initially laying out the nodes nearest the root and by then adding more nodes as more of the structure is traversed. They also disclose techniques for mapping the plane onto a Euclidean display region such as a unit disk. Initially, a tree has its root at the center or focus of the display region, but the display can be smoothly transformed to bring other nodes into focus. Changes of focus can be implemented by adjusting the focus of the mapping from the hyperbolic plane to the Euclidean plane, such as by a transformation in the hyperbolic plane that moves a new focus to the location that is mapped to the center of the unit disk.

Lamping et al., U.S. Pat. No. 5,590,250, disclose similar layout techniques in which each node has a data structure that includes its position and radius and, if it has children, a link to a list of children; complex numbers are used to represent positions in the negatively curved space such as hyperbolic plane. Lamping et al. also disclose similar mapping techniques in which a transformation is performed on positions in a layout space and the transformed positions are then mapped to obtain positions on a display; mapping is performed recursively, beginning at the root node.

The above documents are incorporated herein by reference in their entireties.

The hyperbolic tree technique disclosed by Lamping et al. provides a smoothly-varying focus+context or fisheye view. The display space allocated to a node falls off continuously with distance from the focus. The context always includes several generations of parents, siblings, and children, making it easy for the user to explore the hierarchy without getting lost. The tree is initially displayed with its root at the center, but the display can be smoothly transformed to bring other nodes into focus.

The hyperbolic tree technique supports effective interaction with much larger hierarchies than conventional hierarchy display techniques and complements the strengths of other novel tree browsers.

A lot of work has been done to visualize the unweighted hyperbolic trees. However, no study has been proposed about the weighted tree layout based on the hyperbolic geometry.

Since weighted trees are very common in real applications, such as weighted topic trees, weighted organization charts, weighted file directories, etc. the inventor persists in the improvement on visualizing the weighted trees.

SUMMARY OF THE INVENTION

The object of the invention is to provide a method of displaying a weighted tree based on hyperbolic geometry, thereby enabling the advantages of hyperbolic tree technique in displaying the weighted tree.

The invention provides a method for displaying a weighted tree based on hyperbolic geometry, comprising: obtaining weighted tree data; defining a weighted tree structure; positioning the root node in a negatively curved space as a center, based on the weighted tree defining data; based on the weighted tree defining data, performing layout processing for each parent node and all its direct child nodes from top to bottom recursively, until all the nodes in the tree have been laid out in the negatively curved space, wherein the higher the weight of an edge connecting the parent node and each of its direct child nodes is, the shorter the distance between the parent node and the child node is; mapping the layout data from the negative curved space to an Euclidean plane; and displaying the mapped data in display.

In an embodiment, the method further comprises changing focus or position corresponding to the display center by clicking on any visible point to bring it into focus at the center, or by dragging any visible point interactively to any other position; and re-performing the mapping step and the displaying step.

In an embodiment, the negatively curved space is a hyperbolic plane.

The positioning step may comprise allocating a wedge in the negatively curved space to the parent node, wherein the more the number of the parent node's descendants is, the bigger the angle of the wedge is; sorting all the direct child nodes of the parent node into groups, wherein each node in the same group has the same rank of weight; and starting from one ray of the wedge, allocating a position to each of the child nodes in a specified group order, wherein each of the allocated positions is at least some minimum distance apart from other allocated positions.

In an embodiment, the specified group order is from high rank to low rank.

The positioning step may also comprise sorting all the direct child nodes of the parent node into groups, wherein each node in the same group has the same rank of weight; calculating a center point for each group wherein the higher the ordinal number of the group in a specified group order is, the bigger the rotation angle corresponding to the center point is, and the higher the weight associated with the group is, the smaller the distance between the center point and the parent node is; and positioning all the nodes belonging to the same group along an arc having the radius as the distance between the center point and the parent node, and with the center point as a center, wherein all the nodes belonging to the same group are at least some minimum distance apart from each other.

In an embodiment, the locus of the center points in the arcs fits a spiral-like curve.

In an embodiment, the wedge is of an angle of 360 degrees.

The invention also provides a method of operating a computer system; the computer system including: memory; user input device for providing data indicating signals from a user; a display; and a processor connected for accessing data stored in the memory, for receiving data indicating signals from the user input device, and for providing data to the display to trigger the presentation of images; the method comprising: obtaining weighted tree data; defining a weighted tree structure; positioning the root node in a negatively curved space as a center, based on the weighted tree defining data; based on the weighted tree defining data, performing layout processing for each parent node and all its direct child nodes from top to bottom recursively, until all the nodes in the tree have been laid out in the negatively curved space, wherein the higher the weight of an edge connecting the parent node and each of its direct child nodes is, the shorter the distance between the parent node and the child node is; mapping the layout data from the negative curved space to an Euclidean plane; and displaying the mapped data in display.

The invention also provides a computer system comprising: memory; user input device for providing data indicating signals from a user; a display; and a processor connected for accessing data stored in the memory, for receiving data indicating signals from the user input device, and for providing data to the display to trigger the presentation of images; the processor being configured for obtaining weighted tree data defining a weighted tree structure; positioning the root node in a negatively curved space as a center, based on the weighted tree defining data; based on the weighted tree defining data, performing layout processing for each parent node and all its direct child nodes from top to bottom recursively, until all the nodes in the tree have been laid out in the negatively curved space, wherein the higher the weight of an edge connecting the parent node and each of its direct child nodes is, the shorter the distance between the parent node and the child node is; mapping the layout data from the negative curved space to an Euclidean plane; and displaying the mapped data in display.

According to the invention, a spiral-like layout is integrated into the hyperbolic tree layout, allowing the user to leverage the advantages of hyperbolic tree to visually explore and compare large sets of weighted trees in an intuitive way.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

Wherever possible, the same reference numbers will be used throughout the drawings to the same or the like parts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings. In the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with computers, processors and etc. have not been shown or described in detail to avoid unnecessarily obscuring descriptions of the embodiments of the invention.

Unless the context requires otherwise, the word "comprise" and variations thereof, such as, "comprises" and "comprising" are to be construed in an open, inclusive sense, that is, as "including, but not limited to."

Figure 1:
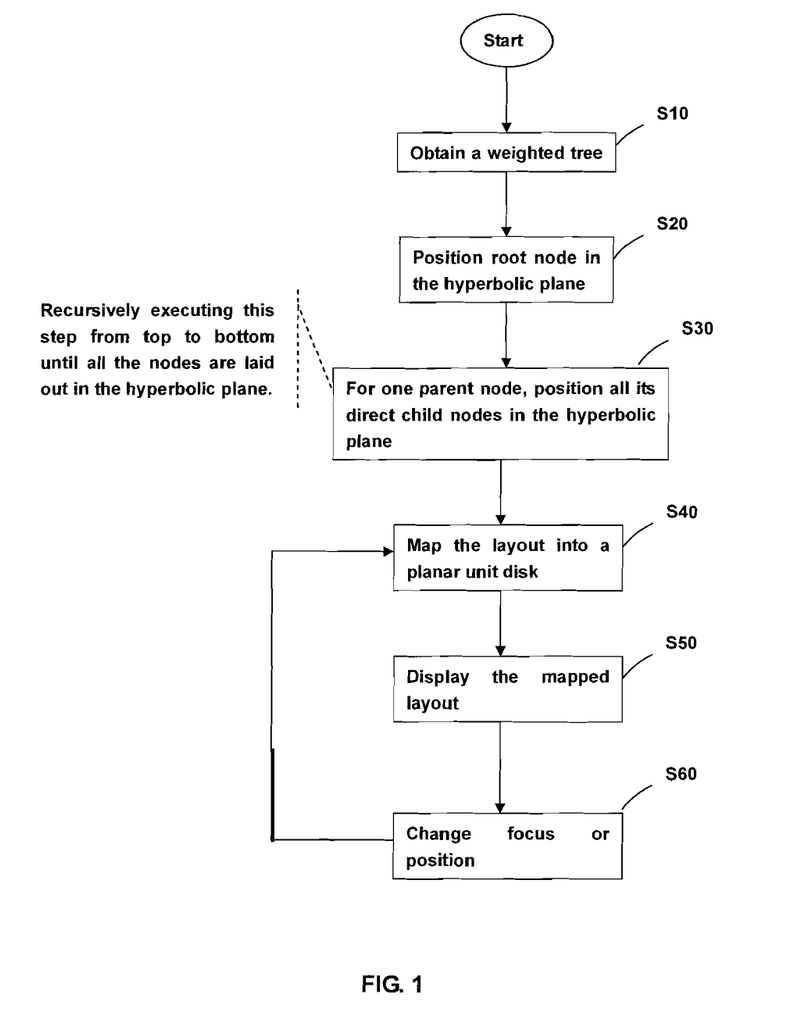
FIG. 1 is a flowchart of an example method according to an embodiment of the invention, showing how weighted tree data defining a weighted tree structure can be used to obtain layout data indicating positions in a hyperbolic plane, from which a mapping to a planar unit disk can be performed.

FIG. 1 is a flowchart of an example method according to an embodiment of the invention, showing how weighted tree data defining a weighted tree structure can be used to obtain layout data indicating positions in a hyperbolic plane, from which a mapping to a planar unit disk can be performed. A "planar unit disk" is a two-dimensional Euclidean space bounded by a circular perimeter, with first and second perpendicular axes that cross at the center of the perimeter, and with a radius along each axis from the center to the perimeter of one. As a result, each position in the planar unit disk can be uniquely identified by two coordinates, each between +1 and −1. The mapping is for example a conformal mapping, a projective mapping, etc. A "conformal mapping" from a hyperbolic plane to a planar unit disk is a mapping that preserves angles but distorts lines in the hyperbolic space into arcs in the unit disk. One conformal mapping is sometimes referred to as the "Poincare model." A "projective mapping" from a hyperbolic plane to a planar unit disk is a mapping that takes lines in the hyperbolic space into lines in the unit disk but distorts angles. One projective mapping is sometimes referred to as the "Klein model."

In FIG. 1, at step S10, weighted tree data defining a weighted tree structure is obtained.

Figure 3:
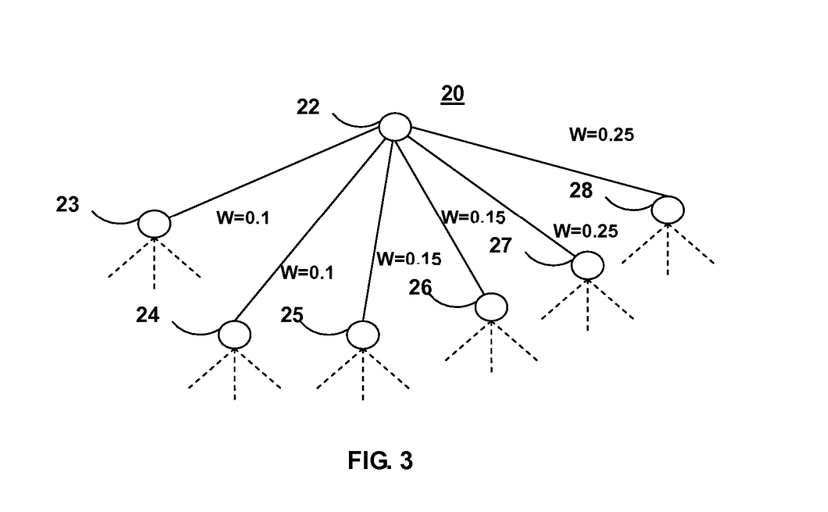
FIG. 3 shows an example of a part of a weighted tree structure.

A part of the weighted tree structure is illustratively shown in FIG. 3. As shown in FIG. 3, weighted tree structure 20 includes nodes and links that relate the nodes. FIG. 3 shows an exponentially growing branch of weighted tree structure 20, with a top level node (root node) 22 related to each of lower level nodes (child nodes) 23, 24, 25, 26, 27 and 28 through one link. As suggested by the dashed lines, each of lower level nodes 23, 24, 25, 26, 27 and 28 is in turn related to a number of (for example, three) nodes at a next lower level. In a weighted tree structure, each node having the same parent node has a relative weight. As shown in FIG. 3, for example, lower level nodes 23, 24, 25, 26, 27 and 28 have weights 0.1, 0.1, 0.15, 0.15, 0.25, and 0.25 respectively. Various data formats known in the art can be used to represent a weighted tree structure.

Returning to FIG. 1, at step S20, the root node (top most node of the tree) is positioned in the hyperbolic plane as a center, based on the defining data obtained at step S10. Referring to the example shown in FIGS. 3 and 4, root node 22 is positioned at node 34 in the hyperbolic plane 32 as a center.

Next, based on the defining data obtained at step S20, at step S30, the method performs the layout processing for each parent node and all its direct child nodes from top to bottom recursively, until all the nodes in the tree have been laid out in the hyperbolic plane.

Figure 2:
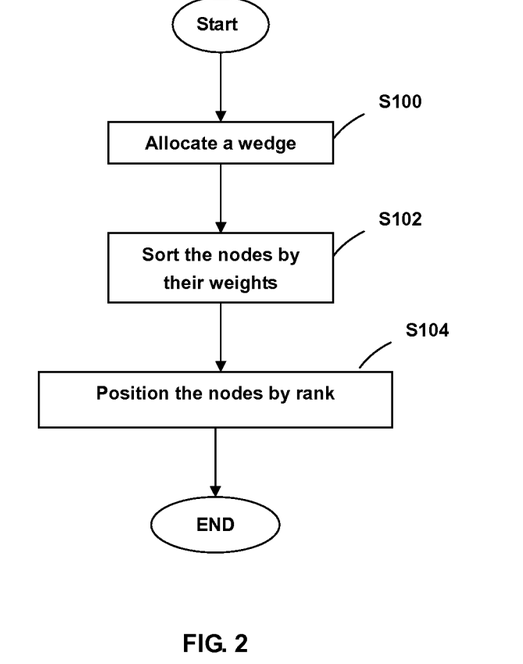
FIG. 2 is a flowchart showing a layout example of step S30 in FIG. 1.

For one parent node and its direct child nodes, that is, for one iteration of the recursive execution, FIG. 2 shows a flowchart for illustrating a layout method of step S30 in FIG. 1.

The layout method starts from step S100. At step S100, the parent node is allocated a wedge in the hyperbolic plane.

A "wedge" in a layout space is a partially bounded region of the space that has a vertex and is between two rays that extend from the vertex. A "wedge angle" is the angle at which the rays bounding a wedge diverge from the wedge's vertex. A wedge angle may be greater than 180 degree, and may even be 360 degree if the two rays are identical, in which case the wedge includes all of the layout space. An arc is "within" a wedge in a layout space if the arc does not extend across the boundary between the wedge and the part of the layout space outside the wedge. Two or more wedges "do not overlap" or "are not overlapping" if none of the wedges includes any part of any of the other wedges.

If the parent node is an upper level node's (grandparent) child, it will typically get a wedge that spans about as big an angle as does the grandparent's wedge. To obtain a more compact layout for non-uniform tree structures, this is modified so that siblings that have more descendants get more room than siblings that don't.

Figure 4:
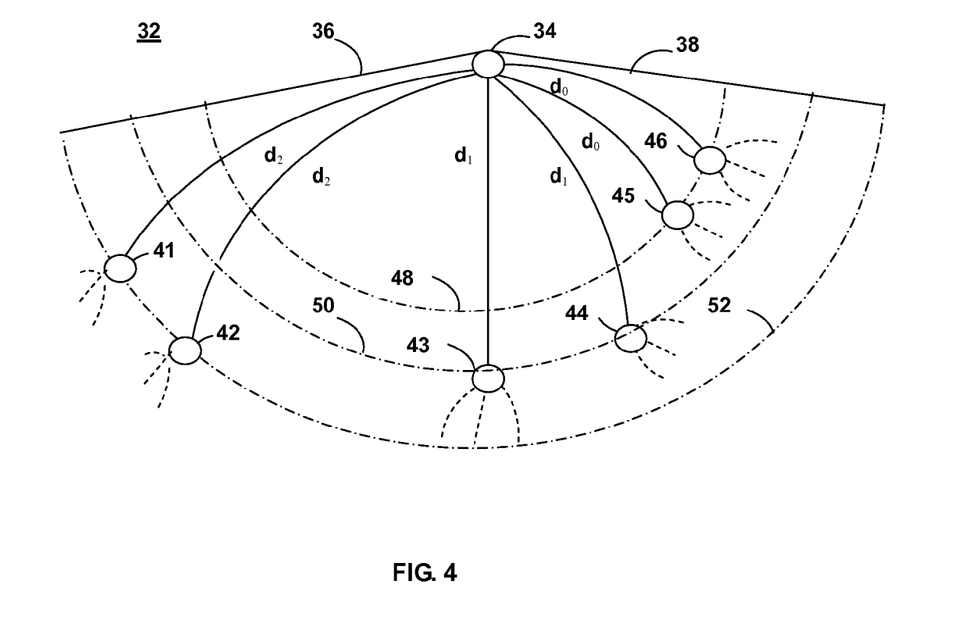
FIG. 4 shows the part's layout on a hyperbolic plane according to the layout shown in FIG. 2.

For example, the parent 34 is allocated a wedge bounded by two rays 36 and 38, as shown in FIG. 4.

Next, at step S102, all the child nodes of the parent node are sorted into groups, wherein each node in the same group has the same rank of weight. The larger a node's weight is, the higher its rank is. In an embodiment, nodes having the same weight have the same rank and belong to the same group. For example, nodes 41, 42, 43, 44, 45, and 46 as shown in FIG. 4 corresponds to nodes 23, 24, 25, 26, 27, and 28 as shown in FIG. 3. Nodes 41, 42, 43, 44, 45, and 46 have weights 0.1, 0.1, 0.15, 0.15, 0.25, and 0.25 respectively. By sorting, there are three ranks and groups:

---
rank 1, group 1, nodes 45 and 46, weights 0.25;
rank 2, group 2, nodes 43 and 44, weights 0.15;
rank 3, group 3, nodes 41 and 42, weights 0.1.
---

In another embodiment, any two nodes sorted into one group need not have exactly the same weights, as long as their weights meet predetermined sorting criteria, for example, the maximum difference between any two nodes in one group is below a predetermined small threshold (that is to say, their weights are close to each other sufficiently).

Next, at step S104, in the group order from high rank to low rank, all the child nodes of the parent node are positioned within the parent node's wedge. Starting from one ray of the wedge, the nodes of the first group are positioned along an arc in that wedge towards another ray of the wedge, at an equal distance from the parent node, and far enough out so that the these nodes are at least some minimum distance apart from each other. For the nodes of the next group, starting from the last positioned node of the previous group, the nodes of the next group are positioned along an arc in that wedge towards another ray of the wedge, at an equal distance from the parent node, and far enough out so that the these nodes are at least some minimum distance apart from each other and from those nodes of the previous groups. The higher the rank of the group (more exactly, the weight or the average weight of the group's nodes) is, the shorter the distance from the parent node is (for example, the distance is in inverse proportion to the rank or weight).

For example, referring to FIG. 4, nodes 45 and 46 of the highest weights 0.25 (rank 1, group 1) are positioned along arc 48, at an equal distance $d_0$ from parent node 34, and are at least some minimum distance apart from each other. Nodes 43 and 44 of the next highest weights 0.15 (rank 2, group 2) are positioned along arc 50, at an equal distance $d_1$ from parent node 34, and are at least some minimum distance apart from each other and from nodes 45 and 46 of the previous group 1. Nodes 41 and 42 of the lowest weights 0.1 (rank 3, group 3) are positioned along arc 52, at an equal distance $d_2$ from parent node 34, and are at least some minimum distance apart from each other and from nodes 45 and 46 of the previous group 1 and nodes 43 and 44 of the previous group 2.

Although the nodes are positioned in the group order from high rank to low rank in the above description, the group order can be determined as required.

Returning to FIG. 1, at step S40, the layout data is mapped onto a planar unit disk, that is, Euclidean plane. The mapping can be performed through the methods disclosed in Lamping, J. and Rao, R., "The Hyperbolic Browser: A Focus+Context Technique for Visualizing Large Hierarchies", Journal of Visual Languages and Computing, Vol. 7, 1996, pp. 33-55, U.S. Pat. No. 5,590,250, etc.

Next, at step S50, the mapped data is displayed on a display.

Next, at step S60, focus or position corresponding to the display center can be changed by clicking on any visible point to bring it into focus at the center, or by dragging any visible point interactively to any other position, and then, the processing proceeds to step S40 to put the change of focus into effect, achieving interactive exploration and navigation. The change of focus can be performed through the methods disclosed in Lamping, J. and Rao, R., "The Hyperbolic Browser: A Focus+Context Technique for Visualizing Large Hierarchies", Journal of Visual Languages and Computing, Vol. 7, 1996, pp. 33-55, U.S. Pat. No. 5,590,250, etc.

Figure 5:
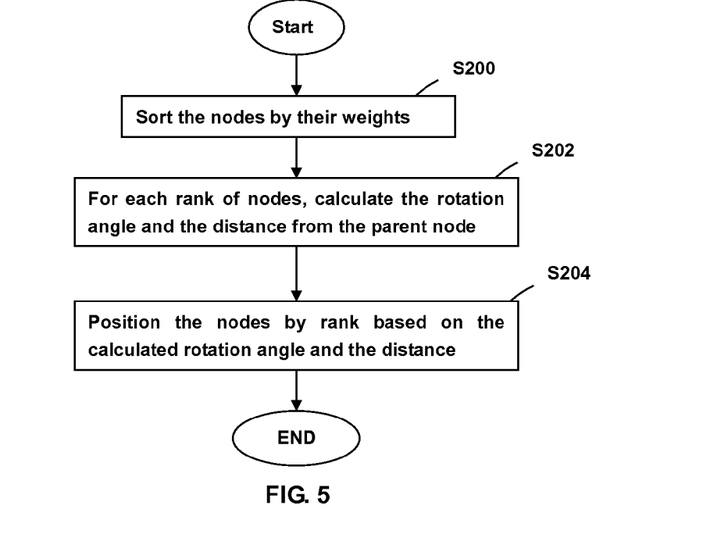
FIG. 5 is a flowchart showing another layout example of step S30 in FIG. 1.

FIG. 5 is a flowchart showing another layout example of step S30 in FIG. 1, where the wedge of the parent node is of an angle of 360 degrees.

As shown in FIG. 5, the method starts from step S200, wherein the child nodes are sorted in a similar way to step S102 in FIG. 2.

Next, at step S202, for each group of nodes, calculate the rotation angle θ and the distance d from the parent node. The rotation angle θ is an angle defined by the ray of the wedge of the parent node and a line starting from the parent node along a radial direction. The distance d from the parent node for a given group is a function of weight or average weight of the group's nodes such that as the weight increases, the distance d decreases. The nodes of a given group are to be arranged along a circular arc where the center of the circle is the parent node and its radius is the distance d calculated based on the weight associated with the group. These nodes are apart from each other with at least some minimum distance and have a center point along the arc. Therefore, the rotation angle θ of the group is an angle defined by the ray of the wedge of the parent node and the line starting from the parent node to the center point. The rotation angle θ is calculated such that the angle θ of the current group is always larger than the angles θ of previous groups. The calculating order of the groups may be from high rank to low rank, or may be determined as required.

Figure 6:
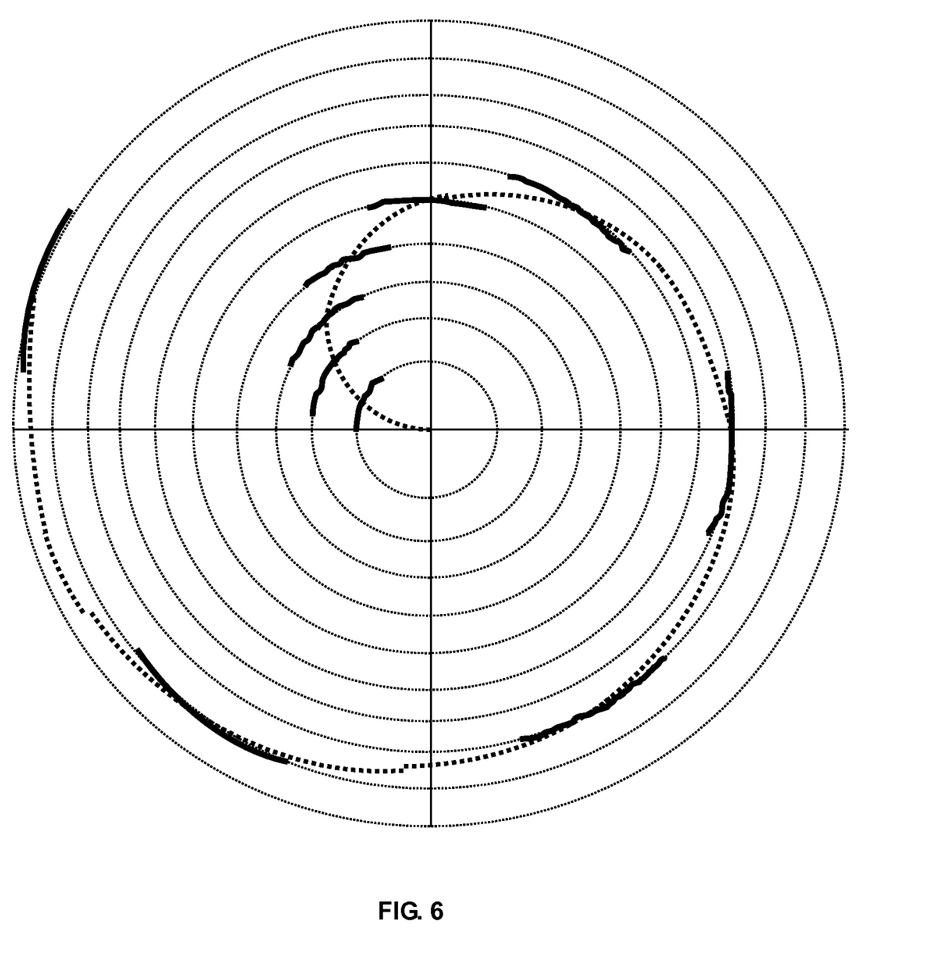
FIG. 6 shows the part's layout on a hyperbolic plane according to the layout shown in FIG. 5.

For example, FIG. 6 shows the part's layout on a hyperbolic plane according to the layout shown in FIG. 5, where the calculating order of the groups is from high rank to low rank, and the locus of the center points fits a spiral-like curve. As shown in FIG. 6, the thick dotted line is the spiral curve. The thin dotted circles are concentric circles having radii corresponding to the calculated distance d for the groups. The thick arcs pass through the spiral curve and are centered to the parent node laid in the center. The nodes of the same group (i.e., having the same weights or similar weights) are placed on the same thick arc. The cross point between one thick arc and the spiral curve is a center point. It should be noted that, although the ordinal number of the group in the calculating group order and associated angle θ satisfy a relation of spiral curve such as ordinal number=αθ, where α is a constant, they can satisfy other relation such as an involute curve, as long as the angle θ increases as the ordinal number increases.

Figure 7:
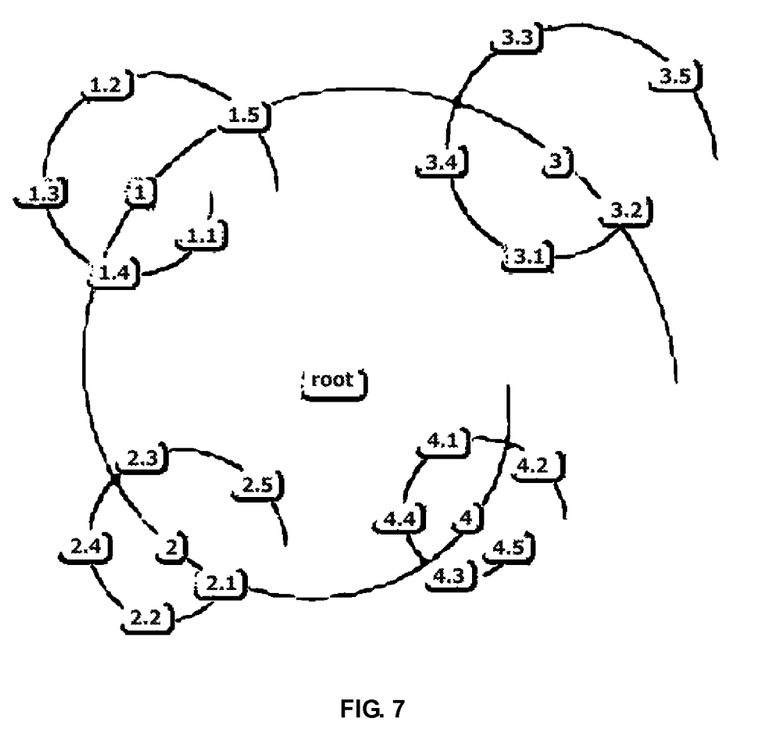
FIG. 7 schematically shows an example layout of a weighted tree on the hyperbolic plane by using the method of FIG. 5.

FIG. 7 schematically shows an example layout of a weighted tree on the hyperbolic plane by using the method of FIG. 5.

Figure 8:
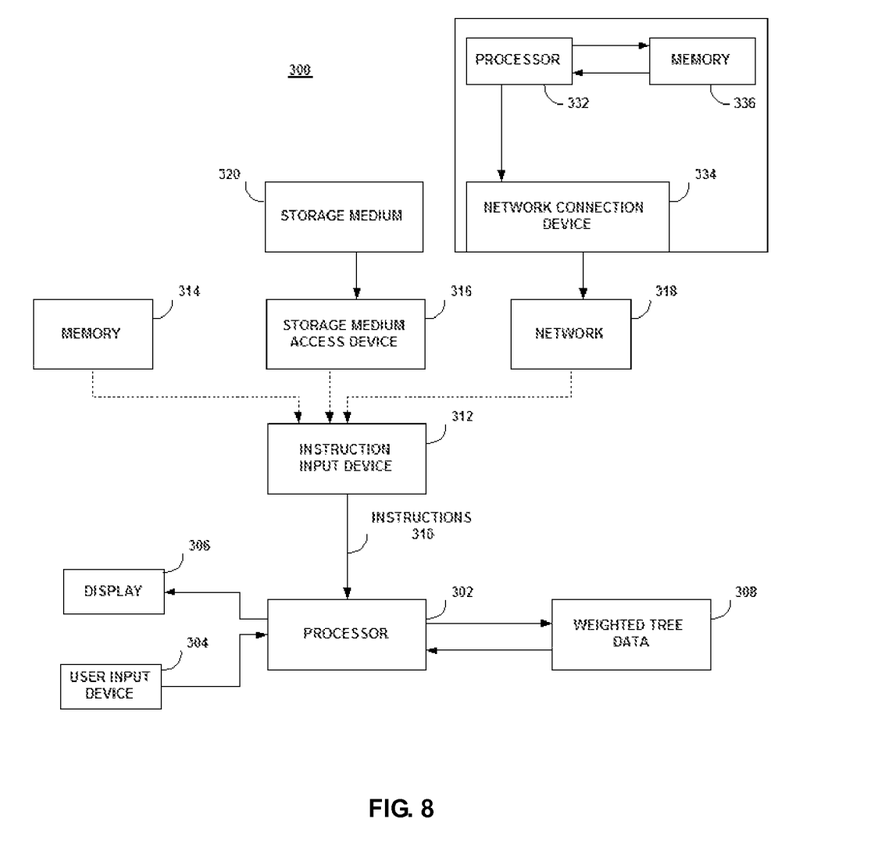
FIG. 8 shows a general configuration of a computer system for performing the method of the invention.

FIG. 8 shows a general configuration of a computer system for performing the method of the invention.

Computer system 300 in FIG. 8 includes processor 302 such as CPU connected for receiving data indicating user actions from user input device 304 such as mouse, keyboard, touch screen and etc., and for providing data defining images to display 306. Processor 302 is also connected for accessing weighted tree data 308, which define a weighted tree structure as described above in relation to FIG. 3. Processor 302 is also connected for receiving instruction data 310 indicating instructions through instruction input device 312, which can illustratively provide instructions received from connections to memory 314, storage medium access device 316, or network 318.

In executing the instructions indicated by instruction data 310, processor 302 uses weighted tree data 308 to obtain layout data indicating positions of parts of the weighted tree structure in a hyperbolic plane, as in step S30 in FIG. 1, all the steps in FIG. 2 and all the steps in FIG. 5. Processor 302 then uses the layout data to present a first representation of the weighted tree structure on display 306 as in steps S40 and S50 in FIG. 1. When processor 302 receives data indicating a user signal from user input device 304 and the signal indicates a change from a first display position to a second display position as in step S60 in FIG. 1, processor 302 can automatically present a second representation of the weighted tree structure on display 106, with the position of a visible point or focus near the first display position changed to near the second display position, as in steps S40 and S50 in FIG. 1.

As noted above, FIG. 8 illustrates three possible sources from which instruction input device 312 could receive data indicating instructions: memory 314, storage medium access device 316, and network 318.

Memory 314 could be any conventional memory within computer system 300, including random access memory (RAM) or read-only memory (ROM), or could be a peripheral or remote memory device of any kind.

Storage medium access device 316 could be a drive or other appropriate device or device for accessing storage medium 320, which could, for example, be a magnetic medium such as a set of one or more tapes, diskettes, or floppy disks; an optical medium such as a set of one or more CD-ROMs; or any other appropriate medium for storing data. Storage medium 320 could be a part of computer system 300, a part of a server or other peripheral or remote memory device, or a part of a software product. In each of these cases, storage medium 320 is an article of manufacture that can be used in computer system 300. Data units can be positioned on storage medium 320 so that storage medium access device 316 can access the data units and provide them in a sequence to processor 302 through instruction input device 312. When provided in the sequence, the data units form instruction data 310, indicating instructions as illustrated.

Network 318 can provide instruction data 310 received from computer system 330. Processor 332 in computer system 330 can establish a connection with processor 302 over network 333 through network connection device 334 and instruction input device 312. Either processor could initiate the connection, and the connection could be established by any appropriate protocol. Then processor 332 can access instruction data stored in memory 336 and transfer the instruction data over network 333 to processor 302 so that processor 302 can receive instruction data 310 from network 333. Instruction data 310 can then be stored in memory 314 or elsewhere by processor 302, and can be executed.

The general features described above could be implemented in numerous ways on various computer systems to obtain and use layout data indicating positions in a hyperbolic plane for parts of weighted tree structures. They can be implemented on, e.g., a Sun SPARC Station running a Unix/X operating system, an Apple Macintosh personal computer, a personal computer running Microsoft Windows, a PDA or smart mobile terminal running PALM OS or Windows CE. The implementations execute instructions written in a C, C++, JAVA programming environment etc.

Although the invention is described in view of a hyperbolic plane, the weighted tree structure can be laid out in any negatively curved space, as long as the relation in which the higher their weights are, the smaller the distances from the parent node are, and the nodes are apart from each other properly.

The above-disclosed subject matter is considered illustrative, and not restrictive, and the appended claims are intended to cover all modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method for displaying a weighted tree based on hyperbolic geometry, comprising:

obtaining weighted tree data defining a weighted tree structure;

positioning a root node in a negatively curved space as a center, based on the weighted tree defining data;

based on the weighted tree defining data, performing layout processing for each parent node and all its direct child nodes from top to bottom recursively, until all the nodes in the tree have been laid out in the negatively curved space, wherein the higher a weight of an edge connecting the parent node and each of its direct child nodes is, the shorter a distance between the parent node and the child node is;

mapping layout data from the negatively curved space to an Euclidean plane; and displaying the mapped data in display, wherein the layout processing step comprises:

sorting all the direct child nodes of the parent node into groups, wherein each node in the same group has a same rank of weight represented by an ordinal number;

calculating a center point for each group by calculating a rotation angle and a distance from the parent node for each group, wherein the higher the ordinal number of the group in a specified group order is the bigger a rotation angle θ corresponding to the center point is, wherein θ is an angle defined by a ray of the wedge from the parent node and a line starting from the parent node along a radial direction, and the higher a weight associated with the group is, the smaller a distance between the center point and the parent node is; and positioning all the nodes belonging to the same group along an arc having a radius as the distance between the center point and the parent node, and with the center point as a center, wherein all the nodes belonging to the same group are at least some minimum distance apart from each other, wherein the locus of the center points in the arcs fits a spiral-like curve spiraling out from the root node at the center.

2. The method of claim 1, further comprising:
changing focus or position corresponding to the display center by clicking on any visible point to bring it into focus at the center, or by dragging any visible point interactively to any other position; and
re-performing the mapping step and the displaying step.

3. The method of claim 1, wherein the negatively curved space is a hyperbolic plane.

4. The method of claim 1, wherein the wedge is of an angle of 360 degrees.

5. A method of operating a computer system; the computer system including:
a memory;
a user input device for providing data indicating signals from a user;
a display; and
a processor connected for accessing data stored in the memory, for receiving data indicating signals from the user input device, and for providing data to the display to trigger presentation of images;
the method comprising:
obtaining weighted tree data defining a weighted tree structure;
positioning a root node in a negatively curved space as a center, based on the weighted tree defining data;
based on the weighted tree defining data, performing layout processing for each parent node and all its direct child nodes from top to bottom recursively, until all the nodes in the tree have been laid out in the negatively curved space, wherein the higher a weight of an edge connecting the parent node and each of its direct child nodes is, the shorter a distance between the parent node and the child node is;
mapping the layout data from the negatively curved space to an Euclidean plane; and
displaying the mapped data in display,
wherein the layout processing comprises sorting all the direct child nodes of the parent node into groups, wherein each node in the same group has a same rank of weight represented by an ordinal number;
calculating a center point for each group by calculating a rotation angle and a distance from the parent node for each group, wherein the higher the ordinal number of the group in a specified group order is, the bigger a rotation angle θ corresponding to the center point is, wherein θ is an angle defined by a ray of the wedge from the parent node and a line starting from the parent node along a radial direction, and the higher a weight associated with the group is, the smaller a distance between the center point and the parent node is; and positioning all the nodes belonging to the same group along an arc having a radius as the distance between the center point and the parent node, and with the center point as a center, wherein all the nodes belonging to the same group are at least some minimum distance apart from each other, wherein the locus of the center points in the arcs fits a spiral-like curve spiraling out from the root node at the center.

6. A computer system comprising:
a memory;
a user input device for providing data indicating signals from a user;
a display; and
a processor connected for accessing data stored in the memory, for receiving data indicating signals from the user input device, and for providing data to the display to trigger the presentation of images;
the processor being configured for
obtaining weighted tree data defining a weighted tree structure;
positioning a root node in a negatively curved space as a center, based on the weighted tree defining data;
based on the weighted tree defining data, performing layout processing for each parent node and all its direct child nodes from top to bottom recursively, until all the nodes in the tree have been laid out in the negatively curved space, wherein the higher a weight of an edge connecting the parent node and each of its direct child nodes is, the shorter a distance between the parent node and the child node is;
mapping layout data from the negatively curved space to an Euclidean plane; and
displaying the mapped data in display,
wherein the layout processing comprises sorting all the direct child nodes of the parent node into groups, wherein each node in the same group has a same rank of weight represented by an ordinal number;
calculating a center point for each group by calculating a rotation angle and a distance from the parent node for each group, wherein the higher the ordinal number of the group in a specified group order is the bigger a rotation angle θ corresponding to the center point is, wherein θ is an angle defined by a ray of the wedge from the parent node and a line starting from the parent node along a radial direction, and the higher a weight associated with the group is, the smaller a distance between the center point and the parent node is; and positioning all the nodes belonging to the same group along an arc having a radius as the distance between the center point and the parent node, and with the center point as a center, wherein all the nodes belonging to the same group are at least some minimum distance apart from each other, wherein the locus of the center points in the arcs fits a spiral-like curve spiraling out from the root node at the center.

7. The computer system of claim 6, wherein the processor is further configured for:
changing focus or position corresponding to the display center in response to clicking on any visible point to bring it into focus at the center, or dragging any visible point interactively to any other position; and
re-performing the mapping step and the displaying step.

8. The computer system of claim 6, wherein the negatively curved space is a hyperbolic plane.

9. The computer system of claim 6, wherein the wedge is of an angle of 360 degrees.

* * * * *